United States Patent [19]

Jacobson et al.

[11] 3,753,002
[45] Aug. 14, 1973

[54] SYNCHRONIZING AND TRANSFER SYSTEM
[75] Inventors: Elton J. Jacobson, Hopkins; Davis W. Schlicher, Richfield, both of Minn.
[73] Assignee: Electric Machinery Manufacturing Company, Minneapolis, Minn.
[22] Filed: May 5, 1972
[21] Appl. No.: 250,576

[52] U.S. Cl. .................... 307/87, 307/23, 318/213
[51] Int. Cl. .......................................... H02p 1/30
[58] Field of Search ........... 307/87, 64, 65, 80, 85, 307/66, 23; 318/195, 213, 216, 218, 217, 220, 221

[56] References Cited
UNITED STATES PATENTS
3,639,820   2/1972   Stemmler .................. 307/87 X
3,655,992   4/1972   Isamu ........................ 307/87
3,646,356   2/1972   Hoffman .................... 307/87

Primary Examiner—J. V. Truhe
Assistant Examiner—William J. Smith
Attorney—Norman N. Popper et al.

[57] ABSTRACT

A synchronizing and transfer system enabling a fully loaded induction motor to be switched from or to a variable frequency converter having a quasi-square wave voltage, to or from a line having a sine wave voltage. Upon the motor to be transferred reaching a full-speed condition, the system senses the frequency and phase angle difference between the converter output and line and acts upon the converter frequency to decrease the difference. When the frequency and phase angle differences are within preset limits, load transfer switching is initiated. During the course of load transfer, an inductive impedance is transiently inserted in series with each phase of the converter output for a period of parallel feed, the impedance acting to prevent excessive cross currents from damaging the converter.

11 Claims, 9 Drawing Figures

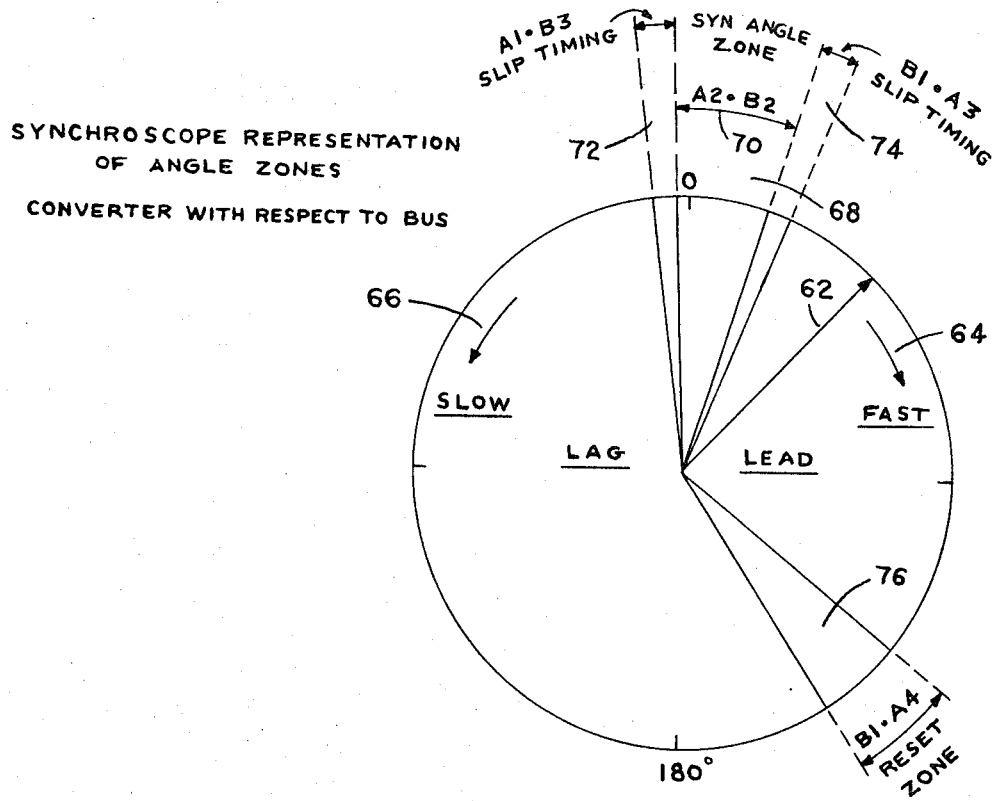
FIG. 4
SYNCHROSCOPE REPRESENTATION OF ANGLE ZONES
CONVERTER WITH RESPECT TO BUS
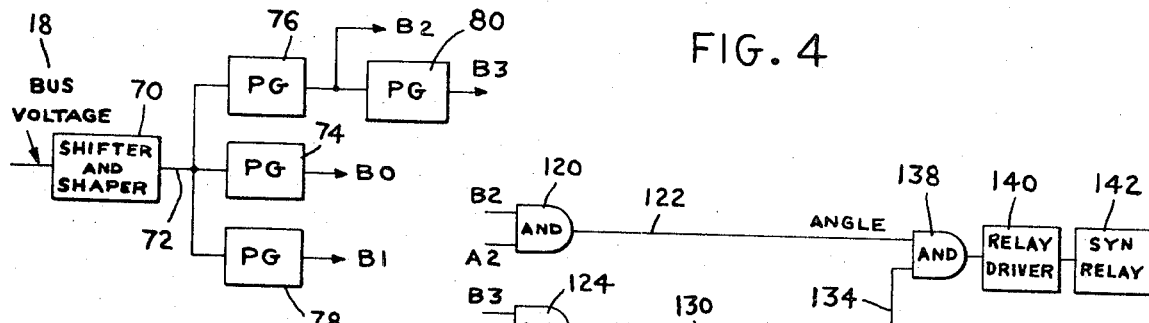
FIG. 5A
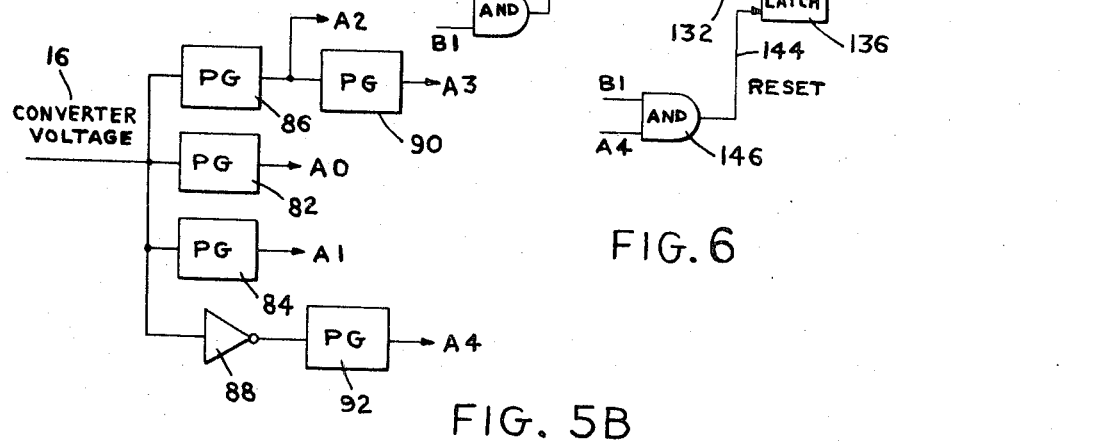
FIG. 5B
FIG. 6

SYNCHRONIZING AND TRANSFER SYSTEM

BACKGROUND OF INVENTION

This invention relates generally to AC induction motors, and more specifically relates to systems for transferring induction motors from a converter output to standard line power.

The AC induction motor is, by nature of its construction, a much more reliable motor than its DC counterpart. However, when operating from a constant frequency, it is also by nature a constant speed device. When the voltage supplied to it is varied, it will vary its speed — but in a very limited manner. In particular, as the speed is reduced, the output torque capability deteriorates rapidly. A special motor is required to give a drive of this type acceptable characteristics. Special motor configurations, however, are expensive and lack the reliability of a standard induction motor.

To obtain the same desirable characteristics from an induction motor that are provided by voltage variation at a DC motor, it is necessary to vary both the voltage and the frequency of the power supply. Varying the speed of a squirrel cage induction motor by a combination of adjustable frequency and voltage has been known for many years. However, until the advent of the silicon controlled rectifier (SCR), which enabled static power conversion to become a practical and accepted technology, it was not economically feasible to provide such a source of power. Within recent years, however, the availability of such SCR-based high power devices has indeed rendered variable speed control of induction motors practical, and an ever-increasing use of the thereby controlled induction motors has been evident.

In numerous practical applications, induction motors as aforementioned, are thus powered through a static adjustable frequency converter, an example of which are the various models of such devices available under the general designation "Ampli-Cycle" from the Electric Machinery Manufacturing Company, Minneapolis, Minn., the assignee of the present application. In a typical application, a converter of the referenced "Ampli-Cycle" type may thus be called upon to drive an induction motor forming the prime mover for a centrifugal pump or similar load requiring a driving torque which normally varies in direct proportion to the square of its speed.

In numerous practical applications, it is further common however, for a plurality of pumps or similar devices to be present in a given environment, with each of the said pumps or similar devices, being driven by a distinct induction motor. In applications of this type, involving a plurality of induction motor-driven devices, it is common to utilize as many of the plural motors as are required to be activated in order to achieve the desired function of the multiple device system incorporating such motors. If, for example, a plurality of pumps are utilized to displace fluid from a reservoir or the like where a given liquid level is to be maintained, it is normally the practice to bring onto the pumping operation as many of the several pumps present as are required to effect a given pumping rate. Assuming, for example, that a very low pumping rate is required, only the first pump may be brought into play, and this pump may not actually be brought up to full speed conditions. That is to say, that the variable frequency converter used therewith may be adjusted to a suitable level as to only operate the first induction motor associated with the said pump at, say, 50 percent of its full speed capabilities. As the pumping demand increases, however, the first pump is brought up to full speed, and then successively the various other pumps present are brought up to full speed in successive serial fashion, so as to provide in totality the required pumping capacity.

In the past, it has been common practice where multiple motor arrangements were present as above described, to associate into the powering system, several variable frequency converters for each of the motors to be thus powered. While a simple and precisely controlled system is thereby enabled for such applications, it will be evident that considerable cost and duplication of function is present in such an approach.

In accordance with the foregoing, it may be regarded as an object of the present invention to provide a system enabling a single, static adjustable frequency converter, to be utilized for bringing several induction motors individually to line speed, and thereafter enabling a smooth transfer of the motors to line power.

It is a further object of the present invention to provide a system enabling an induction motor, initially driven through a static, adjustable frequency converter, to be transferred, upon reaching full speed, to line power, thereby freeing the said converter for powering of successive motors, the said system furthermore incorporating means which enable the transfer from converter to line power to be effected without high starting currents and without excessive loading or disturbance of the converter.

It is a still further object of the present invention to provide a synchronizing and transfer system enabling a fully loaded induction motor to be switched from or to a variable frequency converter having a quasi-square wave voltage output, to or from a line having sine wave voltage, and without cross currents due to high frequency components rising to such levels as could effect damage of the various current-sensitive components present at the converter.

SUMMARY OF INVENTION

Now, in accordance with the present invention, the foregoing objects, and others as will become apparent in the course of the ensuing specification, are achieved in a synchronizing and transfer system enabling a fully loaded induction motor to be switched from or to a variable frequency converter having a quasi-square wave voltage, to or from a line having a sine wave voltage. The system includes means for sensing the frequency and phase angle difference between the converter output and line and means acting upon the converter frequency to decrease the difference. Synchronization matching means are incorporated in the system for sensing when the frequency and phase angle differences are within preset limits, whereupon said means initiates load transfer switching. The switch control logic incorporated in the system is so arranged as to accomplish the resultant transfer in a prescribed sequence and time period, whereby the transfer is effected without the occurrence of unacceptable disturbances in the line at the converter or at the load. During the course of the transfer operation, a paralleling inductive impedance is inserted in series with each phase of the converter output for the parallel feed, whereby to prevent excessive cross currents, while yet maintaining adequate voltage to the induction motor during the transfer process.

BRIEF DESCRIPTION OF DRAWINGS

The invention is diagrammatically illustrated by way of example in the drawings appended hereto in which:

FIG. 4 is a synchroscope type of representation, depicting the vectorial relationship of the converter output with respect to the line output at the power bus utilized in the present system, FIGS. 5A and 5B are simplified block diagrams, setting forth the manner in which a series of signals are derived, which are used in the present system, FIG. 6 is a logic diagram setting forth the principal elements within the synchronization portion of the synchronization matcher block of FIG. 1 herein.

DESCRIPTION OF PREFERRED EMBODIMENT

Figure 1:
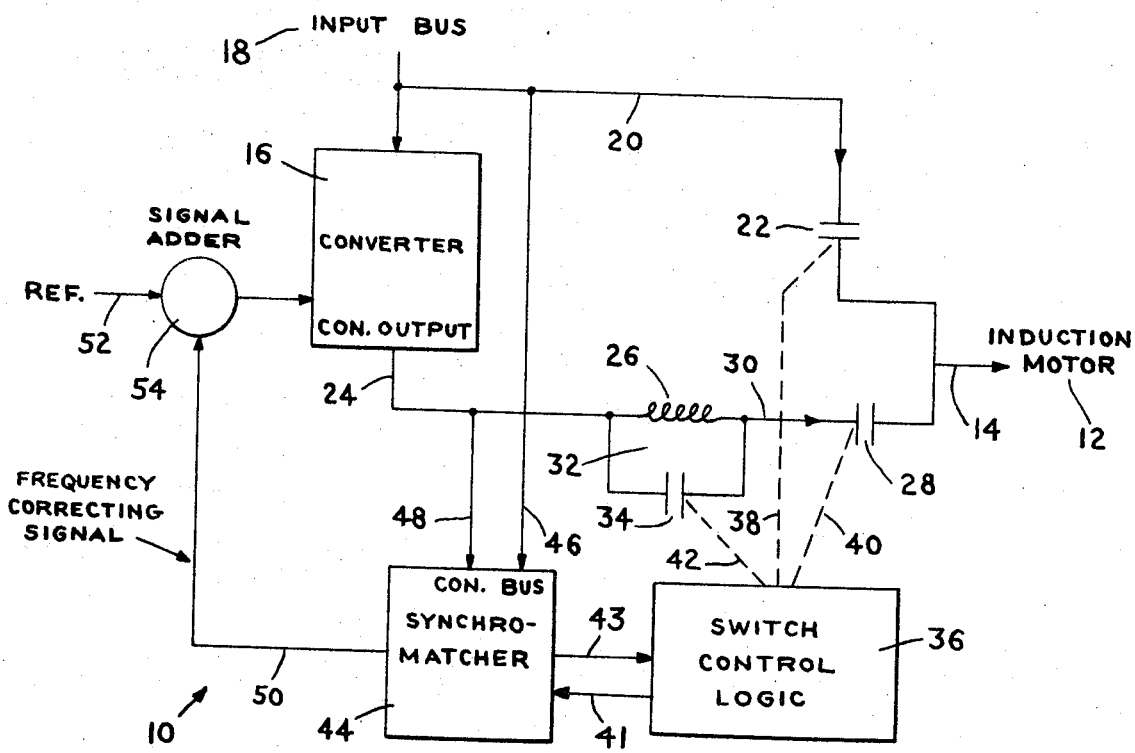
FIG. 1 is a simplified block diagram of a synchronizing and transfer system in accordance with the present invention.

In FIG. 1 a simplified schematic block diagram appears illustrating the principal components of a synchronizing and transfer system 10 in accordance with the present invention. For purposes of simplification the system 10 set forth therein, is shown for use with but a single induction motor 12. In practice, and as will be hereinafter pointed out in connection with FIG. 3, a plurality of such motors will preferably be utilized.

The motor 12 may be regarded as a standard squirrel cage induction motor, which in a typical application is sought to be driven at an adjustable speed in order to provide an output suitable for a variable torque load. Thus for example the motor 12 may be associated with and drive a centrifugal pump or similar load. Power for driving the motor 12 is applied via an input line 14, which in accordance with the invention may be fed either from static adjustable frequency power converter 16, from line power through the input bus 18, or — during portions of the transfer operation — from both sources. In the case of input bus 18, it may be assumed that the latter is provided with a standard AC line input of the usual sinusoidal form. The power thus provided proceeds via line 20 and thence through switch 22 to motor 12.

The aforementioned standard line power is similarly provided through input bus 18 to the static adjustable frequency power converter 16. The said power converter may be of the type previously referred to as available from the Electric Machinery Manufacturing Company of Minneapolis, Minnestoa under the designation "Ampli-Cycle." The converter devices in question, which are well known in the art, are solid state AC to AC power converters designed to transform a constant voltage, fixed frequency power source into an adjustable voltage, adjustable frequency power supply. These converters, in essence, include two basic elements, namely, a rectifier and an inverter, the rectifier acting to change the aforementioned AC line power into DC which is filtered and fed to the inverter section, which thereupon functions to change the DC to an adjustable frequency AC output.

The converter output at line 24 thence may proceed to a branched circuit 32 including a switch 34 in parallel with an inductive impedance 26, the said circuit 32 being interposed between the converter output and a switch 28 in the line 30 proceeding to motor 12.

In accordance with the operation of the present invention, it may be assumed for purposes of FIG. 1 that the induction motor 12 has initially been powered through converter 16 via line 24–30 and switch 28, assumed to be in a closed position. Assuming further that the said motor has been brought up to full operating speed, means are now provided for transfering the motor from the converter 16 to line power input provided thorugh line 20. In order to specifically control the sequence of switching operation, switch control logical block 36 is provided and suitably associated by the control lines 38, 40 and 42, with the power switches 22,28 and 34 to be thereby operated.

Figure 2:
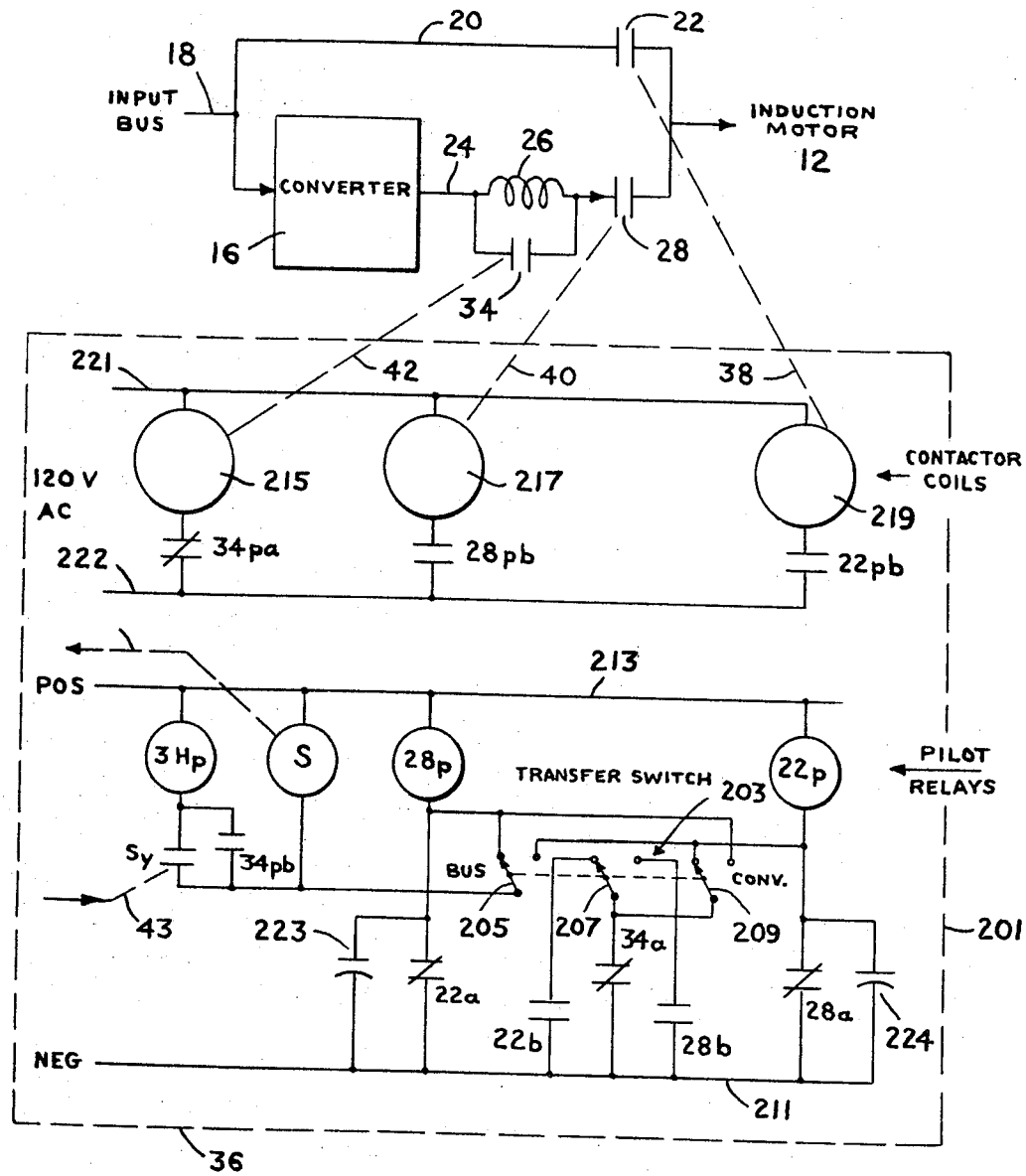
FIG. 2 is a simplified schematic diagram of an exemplary embodiment of the switch logic control block of FIG. 1.

The logic block 36, which will be further discussed in connection with FIG. 2, is seen to be in two way communication with synchro-matcher block 44 via the two lines 41 and 43. Block 36 includes means for operating the several power switches 34, 22 28 and 34 in the prescribed mechanical form, solid state thyristor, motor operated cam switches, stepping switches or hybrid combinations of the aforementioned. Following a request for transfer of motor 12 from converter 16 to line 20 (or vice versa) which request may, in a manner to be set forth, be manually or automatically inserted at block 36, a signal is transferred via line 41 to synchro-matcher block 44 to start operation of the latter unit—which provides suitable analysis of the converter and line inputs as to enable transfer at an appropriate point in time. The synchro-matcher block 44 is thus seen to be provided with an input from the line power bus via line 46, and from the converter putput via line 48. The said block 44 thereupon provides a control signal for logic block 36 through the line 43 which signal activates the latter to sequence the aforementioned power switches.

It is also seen that synchro-matcher 44 provides a control output via line 50, which is basically a frequency correcting signal for suitably correcting the converter output prior to power transfer. Such a frequency correcting signal is seen to be combined with a reference signal proceeding from line 52, which may for example be the speed control input to the converter, such signals being combined at signal adder 54, which is a conventional integrator.

The sequence of operations occurring during the power transfer from converter to line in FIG. 1 is as follows: assuming initially switch 28 and switch 34 are in closed positions, the latter is opened which inserts the inductive impedance 26 into the path of power feed for motor 12. Thereupon switch 22 is closed so that at this point in time the motor is powered from standard line power proceeding from the input bus 18 and from a paralleling power feed proceeding from converter 16 and through the inductive impedance 26. Subsequently, switch 28 is opened to complete the power transfer sequence. The period during with which paralleling power is fed from both converter and line, is actually but a couple of cycles. During this period, and as will be hereinafter pointed out the converter output is made to lead the line power slightly in order to compensate for the lag produced by impedance 26. The said impedance functions in the present environment to prevent damage to the low impedance converter, which could otherwise occur because of cross currents arising due to high frequency components which are present by virtue of the relatively square-shaped output of the converter.

In FIG. 2 an examplary embodiment of the switch control logic block 36 of FIG. 1 appears. The block 36 is defined within the dotted outline 201; components corresponding to those of FIG. 1 are identified by corresponding reference numbers.

It should be appreciated in reviewing this diagram that for purposes of simplification only a single line isassumed. In practice a three phase system might be employed in the present environment which would of course multiply the number of contacts in the switches 22, 28 and 34.

If in FIG. 2 it is assumed that motor 12 is initially driven by converter 16, the transfer switch 203 is in the "converter" position, that is to say contact arms 205, 207 and 209 are in the position opposed to that actually shown in the figure. Under these conditions 28p is the only pilot relay energized through the negative, positive line pair 211, 213. Assume now that an operator (or an automatic instrumentality) moves transfer switch 203 to the "bus" position. Relay S operates to provide a signal through line 41 initiating operation of synchro-matcher 44.

After synchro-matcher 44—in a manner to be set forth in detail hereinbelow—has sensed that the slip and angle relationship between converter and bus are within acceptable tolerance for transfer, the contact Sy—which contact is on synchronization relay 142, further discussed hereinbelow in connection with FIG. 6—is closed. This causes operation of pilot relay 34p, opening the normally closed contact 34pa to de-energize contacter coil 215 which had to this time been connected across the 120 Volts drop between lines 221 and 222. The contactor switch 34 then opens to insert impedance 26 in series with the converter output.

Auxiliary contact 34a on the contactor switch 34 is then closed to energize pilot relay 22p, which through normally open contact 22pb and contactor coil 219 closes the contactor switch 22 to provide parallel feed to motor 12. Contact 22a, a normally closed auxiliary contact on the contactor switch 22 is thereby opened to de-energize pilot relays 28p, S, and 34p, which in turn drops out the contactor switch 28 (through normally open contact 28pb), removes power from synchro-matcher 44 and through contactor coil 215 closes switch 34. Capacitors 223 and 224 introduce sufficient time delay to overcome the effect of contact 22a (a normally closed auxiliary contact on the contactor switch 22) opening before contact 22b (a normally open auxiliary contact on contactor 22) closes. 34pb is a seal-in contact around the Sy contact, and prevents shunting of impedance 26 until completion of the transfer, even though contact Sy opens.

Figure 3:
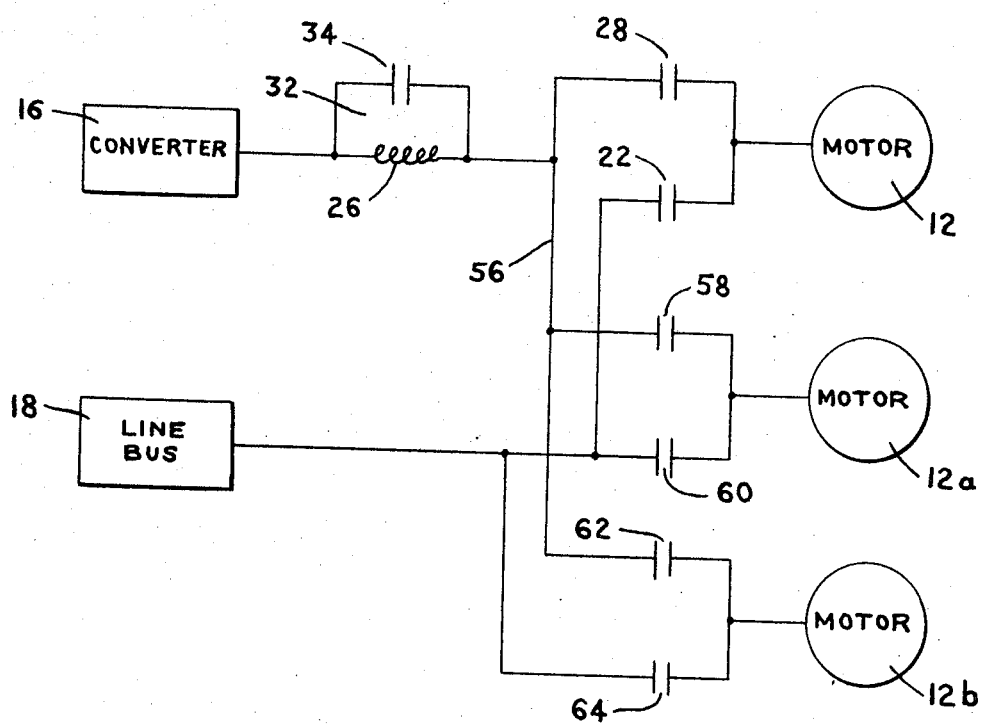
FIG. 3 is a schematic diagram setting forth the basic switching arrangement for enabling parallel feed through an inductive impedance in the course of the transfer operation; where a plurality of induction motors are present.

As has been indicated above the block diagram of FIG. 1 is set forth in a simplified form wherein the basic transfer of power operation is described in connection with a single induction motor. In the simplified schematic diagram of FIG. 3, it is seen that a plurality of induction motors, such as 12 and 12a and 12b may be brought onto line power by the system 10 set forth in FIG. 1. FIG. 3 illustrates only the power flow paths between converter 16 and line bus 18, the control logic block 36, as well as synchro-matcher 44 and the various inter-controlling paths between blocks 36, 44 and converter 16 are not shown. By comparing the FIGS. 1 and 3 it will be evident that the same circuit 32 and sequencing of switches 22, 28 and 34 for bringing motor 12 onto line power, may be followed to successively bring motors 12a and 12b onto the same line power, by simply effecting a corresponding sequency of switch operations for the latter motors. Thus, for example, in the case of motor 12a, such sequency involves (assuming motor 12a at full speed operation and being fed from converter 16 through closed switch 34 line 56 and closed switch 58), an initial opening of switch 34 to insert inductive 26 into the converter feed line, a closing of swtich 60 to provide parallel feed both from bus 18 and from converter 16, and finally a sequential opening of switch 58 to effect complete transfer to line power. The same basic sequence of operations then occurs during transfer of motor 12b, with switch 34 and the switches 62 and 64 associated with motor 12b being sequenced in a manner analogous to that described in connection with motor 12a.

In accordance with the present invention, the switching operation effecting transfer of induction motor from the converter power to line power, is effected at an appropriate moment when the frequency and phase differences between converter output and line are suitable for the said transfer. In this connection two general points should be observed: first, that while the operation of the present system is illustrated for transfer between converter and line power is should throughout be borne in mind that identical principles are involved in effecting the transfer in the opposite direction—that is from line back to converter outputs, the basic problem in both instances is that of providing for transfer to occur under conditions of proper synchronization and in a prescribed order of switching. Secondly, it should be borne into mind, that in some respects transfer of motor from one power source to the second has similarities to the case where successive sychronous generators are brought onto a common line. It should be noted, however, that commonly the technique utilized for effecting this latter sort of operation involves manual adjustment of the generator being brought onto line while simultaneously observing a so-called "synchro-scope" whereat the wave forms of generator and line are displayed. However in the present instance the transfer process is complicated by the fact that one does not have two sine waves, but rather a sine wave and a quasi-square wave. In consequence a dual problem is presented, of not only providing proper phase and frequency relationship, but also providing for limiting of cross currents which might otherwise occur due to high frequency components necessarily present in the relatively square wave shape provided by the converter.

As has been previously indicated this latter aspect of the present problem is dealt with in the present invention by paralleling the feed through an inductive impedance during simultaneous power feed from the two sources, in consequence of which the said cross currents — which might otherwise exceed the current ratings for the commutating ability of the converter SCR's are filtered out and prevented from imposing damage on these sensitive components. Finally, it may be borne in mind, that whereas with two sychronous generators a zero degree phase difference is regarded as ideal, in the present instance it is rather desirable to provide a slight lead for the converter potential with respect to the line power so that at transition the converter is feeding in some current, so as to avoid shock.

In FIG. 4 a graphical presentation appears, which is intended herein for analytical purposes. The showing made therein can be regarded as a synchroscope representation of angle zones, effectively depicting the vectorial relationship of the converter output with respect to the line output at the power bus in the present system. The showing, as mentioned, is intended for purposes of analysis and is not meant to suggest that one actually would utilize a sychroscope instrument in the present system. Examining FIG. 4, however, it is clear that the vector 62 will generally rotate, either in a clockwise or counter-clockwise direction, the former as is suggested by arrow 64 corresponding to a case where the converter frequency is somewhat higher (that is "fast") in comparison with the bus frequency. In either event, a suitable zone will be present, in which the phase relationship between converter and bus is appropriate for effecting transfer. Such zone is shown in FIG. 4 as the "synchronization angle zone" 68. The synchronization zone 68 encompasses an angle 70, which is designated in the Figure as A2·B2. The designation "·" is intended to indicate, in accordance with standard logical notation, that a signal A2 and a signal B2 are both present, said angle being defined by the pulse widths (electrical degrees) of the signal represented by A2 and B2, which signals will be discussed in connection with FIG. 6. Suffice it for present to point out that the angle thus represented will typically have a value of ± 10 degrees from a predetermined reference point. The significance of this statement will be better understood from the discussion of FIG. 6 herein below. Suffice it here to point out that within the said zone 68, conditions may be regarded as appropriate for effecting the said power transfer.

On each side of the synchronization angle zone 68, a relatively narrow "slip timing" zone 72 and 74 appears. If the slip frequency is defined as the difference in frequency between the converter and bus outputs, then clearly in terms of the FIG. 4 synchroscope-type representation, a high rate of slip will correspond to a rapid rotation of vector 62, whereas a low rate of slip will correspond to a relatively low rate of rotation of such vector. In addition to the aforementioned requirement of having the phase between converter and line outputs appropriately related, it will be clear that the rate of slip must be within reasonably low limits. Accordingly, in terms of the vectoral representation shown in FIG. 4 the angles subtended within the slip timing zones 72 and 74, must be relatively small. The signals used to establish the angular width of the zones as a function of time are designated in FIG. 4 as A1, B3, B1 and A3. The logical notation, as utilized, i.e., A1·B3 and B1·A3 is intended to signify that in zone 72 both signals A1 and B3 are present, whereas in zone 74 both signals B1 and A3 must be present. The derivation of the said signals will be discussed hereinbelow in connection with FIG. 6.

Finally, in FIG. 4 it is seen that a reset zone 76 is defined. The said reset zone begins at 150° from a point of zero phase difference. The zone is defined by the presence of two signals B1 and A4 in a logical "AND" relationship. Once again derivation of such signals will be discussed subsequently, but suffice it to point out that the zones are predicated on the assumption that relative displacement of converter and bus outputs to the extent of 150° clearly establishes that transfer is not ready to occur and that resetting of the system ought to be effected.

In FIGS. 5A and 5B, simplified block diagrams appear setting forth the manner in which a series of signals are derived which are used in the present system. Some of these signals have already been referred to in connection with the description of FIG. 4. The said signals are also illustrated in the graphical representation of FIG. 7 in relationship to the primary voltage forms from which they are derived.

Referring then to FIGS. 5A and 5B, it is seen that the bus voltage is applied to a shifter and shaper circuit 70, which is of standard construction as is known in the art, including for example appropriate RC circuit features. The output, therefrom, in line 72, is applied to a series of pulse generators 74, 76 and 78. Outputs B0, B1 and B2 are taken from the alluded-to pulse generators with pulse B2 also being passed through a serially connected pulse generator 80 to provide an additional output B3.

Similarly, in FIG. 5B it is seen that the output from converter 16 is applied to a plurality of pulse generators 82, 84 and 86, which provide the outputs A0, A1 and A2 with the output from pulse generator 86 also being applied to a pulse generator 90 to proivde an additional output A3. The converter voltage output is also applied to a logic inverter 88 and thereby to a pulse generator 92 to provide a further output A4.

Figure 7:
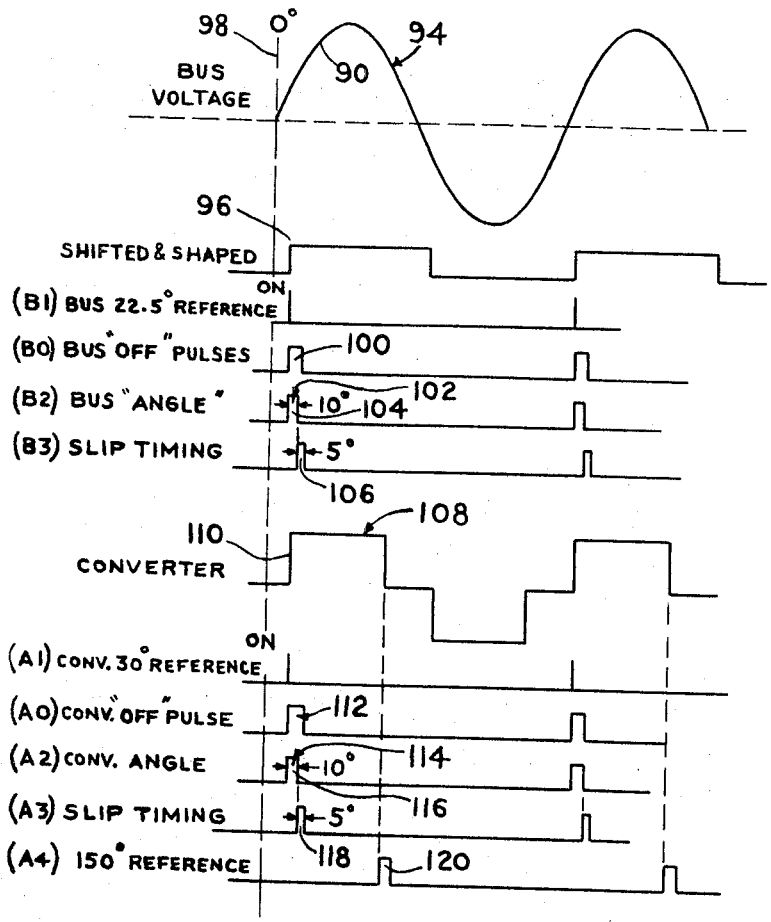
FIG. 7 is a graphic representation setting forth the voltage forms at various key points in the system of the invention.

Referring now to the graphical representation of FIG. 7, the specific forms and relationships of the A and B signals above referred to, is illustrated. Plotted uppermost in FIG. 7 is the bus voltage 94 which is seen to be of standard sinusoidal form. Immediately therebelow the resulting form of the signal following passage through shifter and shaper 70 is set forth. Such signal, at 96, is seen to be squared, and moreover shifted from the reference axis 98 of 0° by a displacement which actually constitutes 22.5 electrical degrees. Immediately therebelow the pulse B1 is shown, which clearly corresponds to the leading edge of signal 96. This sharp pulse B1, is therefore a reference pulse positioned at 22.5° with respect to axis 98. Immediately therebelow the pulse B0 is illustrated, as the square pulse 100. Pulse B0, for reasons which will become apparent, is referred to as a bus "off" pulse. Continuing in the downward direction on the graph, the pulse form B2 is illustrated. The latter 102 is a square pulse resembling pulse B0 and positioned with its edge at the 22.5° reference ordinate. Pulse B2, it will be further noted, is characterized by a width 104 of 10 electrical degrees. Finally, a pulse B3 also derived from waveform 94 is shown, the pulse B3 being positioned in time immediately at the trailing edge of pulse B2 and having a width of 5° as shown at 106. Pulse B3, for reasons that will become apparent, is referred to as a "slip timing" pulse.

Continuing with description of FIG. 7 immediately below the waveforms which have previously been referred to, will be seen the wave form 108 from the converter 16. This waveform 108 it will be noted, is of quasi-square shape, a fact which has already been pointed out. It will be noted, furthermore, that the leading edge 110 of the converter output is positioned at 30° with respect to the axis 98. In turn, the reference signal A1, shown immediately below, is similarly positioned at the 30° reference ordinate. The displacement of the converter output with respect to the 0° axis (at 98), is characteristic of the type of device being used. In any event, as previously mentioned, it is desirable to provide during the power transfer process a slight lead for the convertor output voltage with respect to the line voltage. Since a useful lead for such purpose is about 7.5°, an appropriate shifting enabling such difference must be introduced into the timing pulses of the present system. Such fact explains why in the present system the B1 reference pulse is positioned at the 22.5° off-axis point noted above. In particular the reference position of 22.5° will be seen to reside at the aforementioned 7.5° displacement with respect to reference pulse A1.

Immediately below the graphical showing for pulse A1, and in analogy to the description of pulses derived from the bus voltage waveform 94, it is seen that a pulse 112 is derived, which is of relatively square shpae and will be referred to as the converter "off" pulse, A0. Immediately below pulse 112 the pulse A2, shown at 114, is derived. The leading edge of this pulse A2 is similarly at the 30° reference ordinate, the pulse having a width 116 of 10°.

Immediately below pulse 114 a further pulse 118 is shown, which abounds the trailing edge of pulse 114 and has a width of 5°. This pulse 118, which is the A3 pulse, constitutes the so-called "slip timing" pulse. Finally, in FIG. 7 a square pulse form 120 is shown, constituting the A4 pulse previously referred to. This A4 pulse has its leading edge positioned at the 150° reference ordinate in the graphical showing. The said pulse is used in the resetting operation for the present system, its function having been partially referred to previously in connection with zone 76 shown in FIG. 4 above.

If we consider FIG. 7 further it will become evident that the fundamental objective during power transfer from converter to line power is that of placing the signal B1 and signal A1 in phase with one another. If such is accomplished it will be clear, in view of the foregoing remarks, that the wave forms 94 and 108 representing respectively bus and convertor voltage forms will actually be displaced with respect to one another by the 7.5° that have been previously been indicated as representing the desirable electrical displacement between the two said waveforms.

Referring now to FIG. 6, a simplified logic diagram appears illustrating the manner in which the said result is achieved. It is thus seen in FIG. 5 that an AND gate 120 is provided, the two inputs of which are connected to receive the A2 and B2 signals. By referring to FIG. 4 it will be clear that the output from AND gate 120 creates the zone 68 having an angular width of plus or minus 10°—actually plus or minus 10° about the B1 22.5° reference ordinate. In terms of the logic diagram this specifically means that when an output is present in line 122 from gate 120 the phase relationshi of converter to bus waveform is appropriate for transfer; however, even assuming the phase relationship as stated is satisfactory this does not per se provide appropriate conditions for effecting the power transfer. In addition, cognizance must be taken of whether slippage between converter and line power waveforms is occurring at an unduly high rate.

As a rough measure of whether such slippage rate is thus satisfactory for transfer, it is assumed that the slip should not exceed plus or minus 0.5 HZ over 60HZ. This is to say with reference to FIG. 4 that the rate of rotation of vector 62 should not exceed a 360° rotation within a period of 2 seconds. In order to ensure such conditions it is seen that pair of AND gates 124 and 126 are provided, the first gate being connected to the inputs B3 and A1; the second gate 126 being connected to the inputs A3 and B1. The outputs from AND gates 124 and 126 are connected to an OR gate 128. The output from OR gate 128 is provided to slip timing circuit 130, which typically includes a unijunction transistor set to fire at the end of a given period. If FIGS. 4 and 7 are examined in conjunction with FIG. 6, it will be evident AND gates 124 and 126, respectively, provide signal outputs during the time vector 62 rotates through slip timing zone 72 or 74, depending upon whether the converter waveform is advancing or receding with respect to the bus voltage waveform. Since OR gate 128 must provide an output for a given period in order to assure timing out and firing out of the unijunction transistor at slip timing circuit 130, an output will appear in line 132 only if the rate is appropriately low upon such occurrence slip latch 136 is activated and a signal appears in line 134 from slip latch 136. Thus it will be seen that if both phase relationship and slip rates are appropriate a pair of inputs will be provided to AND gate 138, which then being enabled, provides an output to relay driver 140. The latter is a simple transistor amplifier, which then provides an output to synchronizer relay 142, which initiates the switching action previously discussed in connection with FIGS. 1, 2 and 3.

It will be noted that slip latch 136 is also provided with a resetting input via line 144. The signal to line 144 originates from AND gate 146, which in turn has as its input the signals B1 and A4 shown in FIG. 7. The purpose of the reset signal is that of resetting the slip latch 136 under appropriate conditions. In particular it will be clear that the simultaneous presence of signals B1 and A4 will indicate that the respective signals are 150° out of phase, and under such conditions it's arbitrarily assumed that such wide phase variation indicates that conditions cannot be appropriate for transfer; hence the system should be reset for a further look at the slip conditions.

As has been already indicated in connection with FIG. 1 herein the synchro-matcher block 44, not only performs the function of examining the phase and time relationships between converter output and line waveform, and provides the control signals initiating transfer when conditions are appropriate; but moreover provides a frequency correcting signal, the purpose of which is to adjust the converter output so as to pull the two power waveforms into the desired phase relationship. The manner in which the frequency correcting signal provided to line 50 in FIG. 1 is enabled may now be understood by referring to FIG. 8 herein which sets forth in schematic block fashion the circuitry enabling such result.

Figure 8:
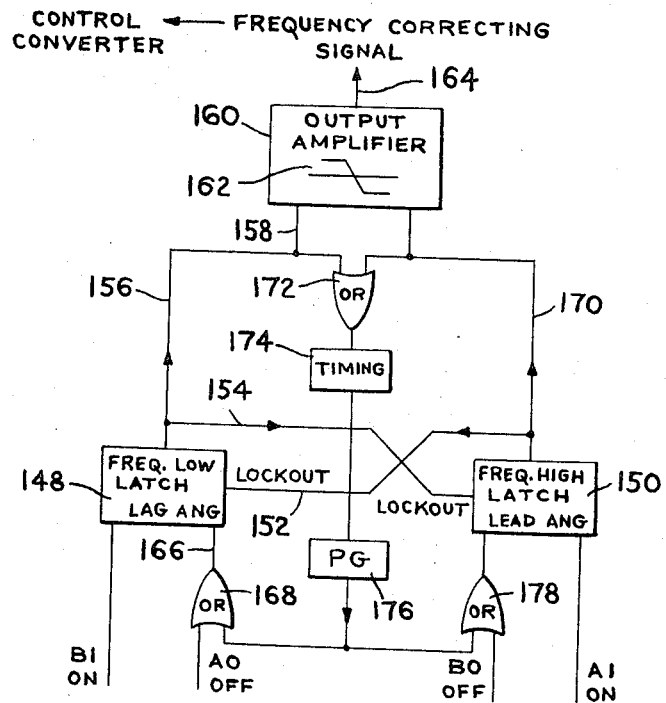
FIG. 8 is a schematic block diagram of the matcher portion of the synchronization-matcher block on FIG. 1, and includes showing of certain portions of the logic circuitry present thereat.

Referring then to FIG. 8, it is seen that a pair of latches 148 and 150 are provided. Latch 148 is designated the "frequency low" latch, whereas latch 150 is designated the "frequency high" latch. It is seen that the frequency low latch 148 is turned on by the occurrence of signal B1 (See FIG. 7) whereas the frequency high latch 150 is turned on by the occurrence of signal A1. Thus one or the other of said latches is turned on, depending upon whether A1 or B1 occurs first in time. Assuming, for example, that the converter is lagging behind the bus output, the B1 signal will occur first, turning on the frequency low latch 148. Both of the aforementioned latches have their respective outputs crossed over to one another via a pair of lockout lines 152 and 154. Accordingly upon latch 148 being thus turned on, latch 150 is immediately locked out.

The signal from latch 148 then proceeds via line 156 through line 158 into output amplifier 160. The latter, as is indicated by the designation 162, provides a frequency correcting signal at its output 164, in a direction such as to increase the frequency of the converter output. It is further noted that the frequency low latch 148, has a second input via line 166, which proceeds from OR gate 168. The input at line 166 acts to turn the said latch off, and as it is seen thatone of the inputs to OR gate 168 is the signal A0, it will be clear that the output from latch 148 in line 156 has a duration proportional to the phase lag between the 'on' and 'off' signals. It will be appreciated that the action described, wherein the frequency low latch 148 is activates in response to signal B1 occurring prior to signal A1, finds its exact analogy in what occurs at the frequency high latch 150, should signal A1 occur prior to signal B1. Finally, it will be observed in FIG. 8 that both the latch outputs in lines 156 or 170, are, in addition to being connected to amplifier 160, also provided to OR gate 172 which together with timing circuit 174 and pulse generator 176 provides a return loop to the OR gate 168 or the OR gate 178 in the respective "off" circuits for latches 150 and 148. The said loop acts to reset the respective latch previously activated, so that the amplifier 160 output does not reach too high a value.

While the present invention has been particularly set forth in terms of specific embodiments thereof it will be appreciated in view of the instant disclosure, that numerous variations upon the invention are now enabled to those skilled in the art, which variations, in propriety, yet reside within the scope of the instant teaching. Accordingly, the invention is to be broadly construed and limited only by the scope and spirit of the claims now handed hereto.

What is claimed is:

1. A synchronizing and transfer system enabling a fully loaded induction motor to be switched from or to a variable frequency converter to or from a line having a sine wave voltage, comprising in combination:
   a. a variable frequency converter;
   b. a source of line power having a sinusoidal potential waveform;
   c. at least one induction motor;
   d. switching means operative to transfer said induction motor between said converter output and said line output; and
   e. synchronization and matching means connected to said line power source to said converter and to said switching means, for sensing the phase relationship between the respective waveforms of said line and converter and the rate of slip of said waveforms with respect to one another, said means being adapted to provide an output to said switching means for activating said transfer of said induction motor upon sensing of selected phase and slip rate conditions between said respective wave forms.

2. A system in accordance with claim 1, wherein said switching means includes transfer initiating means adapted upon external activation to provide a signal to said synchronization and matching means for activating said synchronization and matching means thereby to effect said power transfer.

3. A system in accordance with claims 1 further including an inductive impedance insertable between the output of said converter and said motor, and means to insert said inductive impedance while maintaining a transient period of parallel feed to said induction motor from both said converter and said line power source during said transfer of said motor, said impedance acting to hold cross currents between converter and line power to tolerable levels while the said motor is connected to both.

4. A system according to claim 3 further including means for generating a frequency correcting signal for application in feed back relationship to said converter to thereby alter the converter frequency output in a direction tending to diminish the phase differences between said converter and line power source.

5. A system according to claim 4, wherein said converter has a quasi-square waveform output.

6. A system in accordance with claim 5, including a plurality of said induction motors, said switching means being operative to transfer successive of said motors between said converter and said line output.

7. A system in accordance with claim 5, wherein said synchronization and matching means includes means for generating the first pulse of predetermined width having a fixed relationship to the phase of the said line power waveform, means for generating a second pulse of predetermined width having a fixed relationship to the phase of said converter waveform, and means providing an output upon simultaneous presence of said first and second pulses, said output indicating appropriate phasing conditions between said two waveforms for initiating said transfer.

8. A system according to claim 7, wherein said synchronization and matching means further includes means for generating third and fourth pulses of predetermined width respectively following and first and second pulses, said third and fourth pulses being provided to means connected to receive a pair of reference pulses having a fixed phase relationship to said converter and line waveforms and provide an enabling output during the occurrence of a reference pulse and the associated third or fourth pulse; and timing circuit means connected to receive said enabling output and provide a slip signal upon the occurrence of said enabling output for a predetermined period, said slip signal being thereby indicative of an acceptable rate of slip between said converter and line power waveforms.

9. A system according to claim 8 wherein said slip signal and said output indicative of appropriate phasing are applied to an AND gate, the output of which activates said switching means, whereby said switching means is enabled upon the occurrence of acceptable phasing and slip conditions.

10. A system according to claim 9 wherein said means for generating a frequency correcting signal includes first and second latches respectively turned on by reference signals derived from selected phase point on said line power and converter waveform outputs respectively, whereby one of said latches is activated when said converter waveform lags with respect to said line waveform and the other of said latches is activated when said converter waveform leads with respect to said line waveform; lockout means being provided between said first and second latches for locking out the alternate latch upon activation of one of said latches; said latches having latch outputs connected to an output amplifier adapted to provide a correcting signal to said converter in a direction tending to correct the lag or lead in said frequency output; said latches being connected to turn off upon occurrence of a reference signal in the alternate waveform from that turning said latch on, whereby the said correcting signal has a limited duration representing a function of the said lag or lead between said waveforms.

11. A system in accordance with claim 10 wherein said reference signals are provided to said latches through a pair of OR gates, the other set of inputs for said OR gates being provided by a feedback loop present between said latches and said OR gates, said feedback loop including a timing circuit for delaying said feedback signal, said loop acting to reset said latches following a predetermined period after enabling thereof, whereby said signal to said output amplifier is limited to a predetermined duration.

* * * * *